No. 836,557. PATENTED NOV. 20, 1906.
L. BOIRAULT.
ELASTIC TIRE FOR WHEELS.
APPLICATION FILED FEB. 7, 1906.
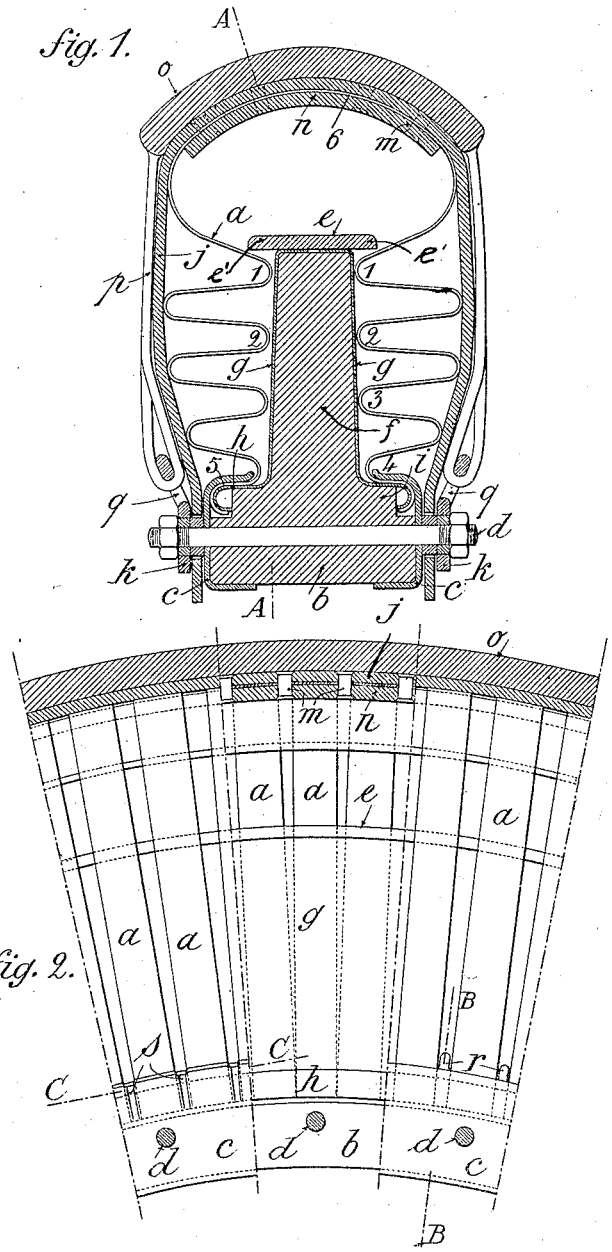
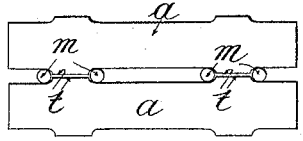
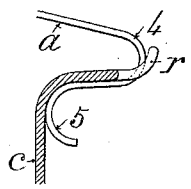
WITNESSES:
W. M. Avery
A. H. Davis
INVENTOR
Louis Boirault
BY
Munn & Co
ATTORNEYS

UNITED STATES PATENT OFFICE.

LOUIS BOIRAULT, OF PARIS, FRANCE.

ELASTIC TIRE FOR WHEELS.

No. 836,557.  Specification of Letters Patent.  Patented Nov. 20, 1906.

Application filed February 7, 1906. Serial No. 299,903.

*To all whom it may concern:*

Be it known that I, LOUIS BOIRAULT, engineer, a citizen of the Republic of France, residing at 8 Rue Emile Gilbert, Paris, France, have invented certain new and useful Improvements in Elastic Tires for Wheels, of which the following is a specification.

This invention relates to an elastic tire comprising a series of corrugated flat springs arranged around the rim or felly and a cover or tread arranged around the said springs. In order that such a tire shall be practical and efficient, several conditions are necessary. Not only the tire must be free to give way in the radial direction, but also it must be prevented from becoming displaced in the direction perpendicular to the plane of the wheel and from getting out of form in the circular direction. These conditions are necessary to allow of the tire resisting both the transversal strain developed when moving in a curve and the tangential strain arising from braking from the action of the motor if the wheels are driving-wheels and the like. Furthermore, the tire must fulfil another essential condition without which the wheel would not run softly or smoothly enough, and that is its elasticity in the transversal direction must be such as to enable it to yield smoothly to the lateral shocks due to roughness in the road. This condition, which may appear contradictory with respect to the condition which consists in preventing the tire from becoming displaced laterally, is fulfilled by arranging guiding members for the springs in such a manner as to enable the whole of each spring to give way in the radial direction, while the median portion only is enabled to move yieldingly in the transversal direction. For the purpose of fulfilling the said conditions the rigid felly is provided with several annular ribs so arranged as to guide the springs and retain the same in the plane of the wheel and preventing their corrugated portion from giving way in a direction transversal to the said plane, while leaving their median portion free to yield in the transversal direction. The said springs are, moreover, held or maintained in the circumferential direction and prevented from riding by means of separating members passing between them and secured to one or more flexible bands placed along the periphery of the tire.

The invention consists neither in arranging on a felly springs surrounded by a flexible band or tread nor in providing the felly with any kind of ribs, but in combining specially the springs with the said ribs and with the band or tread in such a manner as to allow of the springs yielding totally in the radial direction and partially in the transversal direction, while they are in part rigidly supported in the transversal direction and completely so in the circumferential direction.

An embodiment of this elastic wheel is shown, by way of example, in the accompanying drawings, in which—

Figure 1 is a transversal section of a part of the wheel. Fig. 2 is a longitudinal section of a part of the wheel on the line A A. Fig. 3 is a plan view of a part of the tire, the cover being removed. Fig. 4 is a detail sectional view on the line B B of Fig. 2. Fig. 5 is a sectional view on the line C C of Fig. 2.

In the drawings, $a$ designates flat springs, the median portion 6 of which is curved into C shape and the lateral portions of which are so corrugated as to present on each side four inner bights 1 2 3 4 tangent to a line parallel, or nearly so, to the vertical axis of the tire. The ends 5 of the said springs are secured on the felly $b$ by means of lateral metal annular flanges $c$, the profile of which is U-shaped and which fit into the sides of the felly and are clamped thereon by transversal bolts $d$.

The felly $b$ is composed of wooden segments placed end to end and held assembled by the annular flanges $c$ and by an outer annular member $e$. It is provided with a continuous median rib $f$, the lateral faces of which are plane or slightly conical and extend only slightly beyond the bights 1 2 3 4 in order to serve as guides and bearings for the same. The faces of the said rib are provided with sheet-metal plates—such as $g$, for instance—made to fit the rib and designed to be subjected to the friction of the bights of the springs. The inner edges $h$ of the said plates are preferably shouldered and bent downward, so as to bear on the shoulders $i$ of the felly and to serve as bearings for the ends 5 of the springs.

Around the springs is placed a cover $j$, of leather or other suitable flexible material, the edges of which are secured to the sides of the felly by means of annular flanges $k$, clamped by the bolts $d$ or by any other suitable means.

Through interstices provided between the springs $a$ at the periphery of the tire rivets $m$ are projected and secured in the cover $j$. The said rivets are also secured to a leather band $n$, which extends within the springs. The latter are thus prevented from becoming displaced in the direction of the circumference of the wheel and from riding.

The displacement of the ends of the springs may, on the other hand, be prevented in several ways. For instance, the springs may be placed sufficiently near to one another to make their ends touch. There may also be formed on the annular flanges c cut-out projections r, (Fig. 2 to the right,) or stamped projections s, (Fig. 2 to the left,) which take into the interstices of the springs. Similar projections may also be formed on the annular flanges q.

For the purpose of preventing any transversal sliding of the cover on the springs there may be used springs the edges of which are provided with projections t, Fig. 2, which take between the rivets m. However, the adherence of the springs to the flexible bands j n, united by a sufficient number of rivetings, may be sufficiently great to prevent of itself any sliding, in which case the projections t may be dispensed with.

The tire shown is surrounded by a protecting band or tread o, which is held in place by means of lateral straps p, passing through eyelets q, formed in the edges of the annular flanges k.

When the tire thus built up is subjected to a load, the springs a, which transmit the said load to the ground, are compressed, so that their bights 1 2 3 4 slide against the faces of the rib f. If the strain put on the tire is oblique or perpendicular with respect to the plane of the wheel, the springs bear against the rib and slide thereon, so that their corrugated or lateral portions cannot become inclined to any material extent and have only to yield in the direction of the spokes of the wheel. The bight or median portion 6 alone can move in the transversal direction, thus supplying to a suitable extent the required elasticity in that direction to insure the required smoothness of running. The annular member e preferably forms on the sides of the rib f projections e', designed to prevent the bight 1 from sliding over the rib under the action of a transversal strain. The portion of each spring thus enabled to yield laterally is thus limited to that of the bight 1.

The number of the corrugations of the springs and the mode of securing the same on the felly, as well as the minor details of the construction of the felly of the cover and the other parts of the tire, may be varied without departing from the spirit of this invention. For instance, the single median rib f of the tire may be either continuous or composed of segments of wood or of metal, either solid or hollow, or it may be replaced by parallel ribs located either within or without the springs. In the latter case the ribs may be formed on lateral annular flanges or be constituted by the branches of a U-shaped metal rim, which serves as the felly. The outer bights of the corrugations of the springs will then be placed nearly in contact with the inner faces of the said ribs or guide branches. The rivets m may be replaced by any other suitable separating members.

I claim—

1. A wheel having an elastic tire, comprising a wooden felly having an outer median rib, a metal cover on the said rib, having its edges curved inward, a series of curved springs having their lateral portion corrugated and their ends curved to fit on the flanges of the cover, annular flanges curved to fit on the ends of the springs, and means for clamping the said flanges against the said springs and against the sides of the felly.

2. In a wheel having an elastic tire, the combination of a felly, of curved springs having their ends against the sides of the felly, annular flanges adapted to engage the ends of the springs and having projections which penetrate between the said ends, and means to clamp the said flanges against the springs and the felly.

3. In a wheel having an elastic tire, the combination of a felly, an outer rib on the felly, a series of curved springs having their lateral portions corrugated and their ends secured to the felly, and lateral flanges on the said rib adapted to prevent the corrugated portions of the springs from passing above the rib.

4. In a wheel having an elastic tire, the combination of a felly, a series of curved springs having their ends secured to the felly, flexible bands located at the periphery of the wheel, the one within the springs and the other without, and rivets connecting the said bands in passing in the intervals of the springs.

5. In a wheel having an elastic tire, the combination of a felly, a series of curved springs having lateral projections on their median portion and having their ends secured to the felly, flexible bands located at the periphery of the tire, the one within the springs and the other at the outside of the same, and rivets which connect the said bands in passing in the intervals of the springs and in engaging their lateral projections to prevent the said bands from sliding transversely on the springs.

In testimony that I claim the foregoing as my invention I have signed my name in presence of two subscribing witnesses.

LOUIS BOIRAULT.

Witnesses:
HANSON C. COXE,
MAURICE ROUX.